(12) United States Patent
Onozuka et al.

(10) Patent No.: US 10,737,219 B2
(45) Date of Patent: Aug. 11, 2020

(54) EXHAUST GAS PURIFYING CATALYST (71) Applicant: CATALER CORPORATION, Shizuoka (JP)

(72) Inventors: Takashi Onozuka, Shizuoka-ken (JP); Kenichi Taki, Shizuoka (JP); Kyosuke Murakami, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 96 days.

(21) Appl. No.: 16/086,865

(22) PCT Filed: Mar. 13, 2017

(86) PCT No.: PCT/JP2017/010012
§ 371 (c)(1),
(2) Date: Sep. 20, 2018

(87) PCT Pub. No.: WO2017/163985
PCT Pub. Date: Sep. 28, 2017

(65) Prior Publication Data
US 2019/0083932 A1 Mar. 21, 2019

(30) Foreign Application Priority Data

Mar. 22, 2016 (JP) ................. 2016-057142

(51) Int. Cl.
*B01D 53/94* (2006.01)
*B01J 35/04* (2006.01)
(Continued)

(52) U.S. Cl.
CPC ....... *B01D 53/9468* (2013.01); *B01D 53/945* (2013.01); *B01D 53/9472* (2013.01);
(Continued)

(58) Field of Classification Search
CPC .............. B01D 53/9468; B01D 53/945; B01D 53/9472; B01J 23/10; B01J 23/44;
(Continued)

(56) References Cited

U.S. PATENT DOCUMENTS

2009/0041643 A1 2/2009 Deeba et al.
2009/0124492 A1 5/2009 Kitamura et al.
(Continued)

FOREIGN PATENT DOCUMENTS

EP 2 127 744 12/2009
JP 2007-21456 2/2007
(Continued)

OTHER PUBLICATIONS

Extended Search Report for European Application No. 17770028.3 dated Jan. 30, 2019.
(Continued)

*Primary Examiner* — James A Fiorito
(74) *Attorney, Agent, or Firm* — Occhiuti & Rohlicek LLP (57) ABSTRACT

An exhaust gas purifying catalyst according to the present invention is provided with a base material 10 and a catalyst-coated layer 30. The catalyst-coated layer 30 is provided with a lower layer 34 and an upper layer 32. The upper layer 32 contains Rh and/or Pt as a noble metal catalyst. The lower layer 34 contains Pd as a noble metal catalyst. The lower layer 34 is provided with a front-stage lower layer 34*a* positioned on an upstream side and a rear-stage lower layer 34*b* positioned on a downstream side. The front-stage lower layer 34*a* is a Ce-free layer that does not contain a Ce-containing oxide. The rear-stage lower layer 34*b* is a Ce-containing layer that contains a Ce-containing oxide with a pyrochlore structure.

19 Claims, 2 Drawing Sheets

(51) Int. Cl.
*F01N 3/28* (2006.01)
*B01J 37/02* (2006.01)
*B01J 23/63* (2006.01)
*F01N 3/10* (2006.01)
*B01J 23/44* (2006.01)
*B01J 23/46* (2006.01)
*B01J 23/10* (2006.01)
*B01J 35/00* (2006.01)

(52) U.S. Cl.
CPC .............. *B01J 23/10* (2013.01); *B01J 23/44* (2013.01); *B01J 23/464* (2013.01); *B01J 23/63* (2013.01); *B01J 35/0006* (2013.01); *B01J 35/04* (2013.01); *B01J 37/0228* (2013.01); *B01J 37/0244* (2013.01); *B01J 37/0248* (2013.01); *F01N 3/101* (2013.01); *F01N 3/28* (2013.01); *F01N 3/2828* (2013.01); *B01D 2255/1021* (2013.01); *B01D 2255/1023* (2013.01); *B01D 2255/1025* (2013.01); *B01D 2255/2065* (2013.01); *B01D 2255/407* (2013.01); *B01D 2255/908* (2013.01); *B01D 2255/9022* (2013.01); *B01D 2255/9032* (2013.01); *B01D 2257/404* (2013.01); *B01D 2257/502* (2013.01); *B01D 2257/702* (2013.01); *B01D 2258/014* (2013.01); *F01N 2330/06* (2013.01); *F01N 2370/02* (2013.01); *F01N 2510/06* (2013.01); *F01N 2510/0682* (2013.01); *F01N 2510/0684* (2013.01)

(58) Field of Classification Search
CPC ...... B01J 23/464; B01J 23/63; B01J 35/0006; B01J 35/04; B01J 37/0228; B01J 37/0244; B01J 37/0248; F01N 3/101; F01N 3/28; F01N 3/2828
See application file for complete search history.

(56) References Cited

U.S. PATENT DOCUMENTS

| | | |
|---|---|---|
| 2009/0175773 A1 | 7/2009 | Chen et al. |
| 2011/0113754 A1 | 5/2011 | Kohara et al. |
| 2012/0128557 A1 | 5/2012 | Nunan et al. |
| 2012/0128558 A1 | 5/2012 | Nunan et al. |
| 2013/0310248 A1 | 11/2013 | Aoki et al. |
| 2015/0252744 A1* | 9/2015 | Onoe ............... B01J 23/63 60/285 |

FOREIGN PATENT DOCUMENTS

| | | |
|---|---|---|
| JP | 2010-167381 | 8/2010 |
| JP | 2011-212639 | 10/2011 |
| JP | 2012-152702 | 8/2012 |
| JP | 2015-93267 | 5/2015 |
| WO | WO2010/064497 | 6/2010 |
| WO | WO2012/101505 | 8/2012 |
| WO | WO2013/094220 | 6/2013 |
| WO | WO2015071724 | 5/2015 |

OTHER PUBLICATIONS

Office Action for Indian Patent Application No. 201827034034, dated Sep. 24, 2019.

* cited by examiner

EXHAUST GAS PURIFYING CATALYST

CROSS REFERENCE TO RELATED APPLICATIONS

This application is a National Stage of International Application No. PCT/JP2017/010012 filed on Mar. 13, 2017, which claims priority to Japanese Application No. 2016-057142 filed on Mar. 22, 2016, the contents of which are hereby incorporated by reference in their entirety.

TECHNICAL FIELD

The present invention relates to an exhaust gas purifying catalyst. More specifically, the present invention relates to an exhaust gas purifying catalyst provided with a base material and a catalyst-coated layer formed on a surface of the base material.

The present international application claims priority on the basis of Japanese Patent Application No. 2016-057142 filed in Japan on Mar. 22, 2016, the entire contents of which are incorporated herein by reference.

BACKGROUND ART

A three-way catalyst including at least one noble metal among Pt (platinum), Pd (palladium), and Rh (rhodium) is often used to purify exhaust gas discharged from an internal combustion engine such as an automobile engine. In one typical configuration of such a three-way catalyst, a catalyst-coated layer made of alumina is formed on a surface of a highly heat-resistant ceramic base material, and one, two or more noble metals among Pt, Pd, and Rh is carried on the catalyst-coated layer. Among these noble metals, Pd mainly contributes to purification performance of carbon monoxide (CO) and hydrocarbon (HC), while Rh mainly contributes to purification performance (a reduction and purification capacity) of NOx. Therefore, the combined use of Pd and Rh enables hazardous components in exhaust gas to be simultaneously purified in an efficient manner.

In order to efficiently purify components in exhaust gas using such a three-way catalyst, an air fuel ratio that is a mixing ratio of air and gasoline supplied to an engine is desirably in a vicinity of a theoretical air fuel ratio (a stoichiometric ratio). Conventionally, for the purpose of mitigating an atmospheric variation of an air fuel ratio that enables a catalyst to function effectively, a Ce-containing oxide (for example, a ceria-zirconia composite oxide) having an oxygen storage capacity (OSC) is widely used as a carrier of the noble metal (for example, Patent Literature 1). A Ce-containing oxide functions to store oxygen in exhaust gas when an air fuel ratio of the exhaust gas is lean (in other words, in a case of an oxygen-excess atmosphere) and to release stored oxygen when the air fuel ratio of the exhaust gas is rich (in other words, in a case of a fuel-excess atmosphere). Accordingly, stable catalyst performance can be obtained even when an oxygen concentration in exhaust gas fluctuates, and purification performance of the catalyst is improved.

In addition, recently, in order to further improve the performance of exhaust gas purifying catalysts, catalysts are being developed in which, instead of having a single carrier layer carry all of a noble metal catalyst, a catalyst-coated layer is formed with a laminate structure including at least upper and lower two layers, and Pd is carried on a first layer and separated from Rh that is carried on a second layer. For example, Patent Literature 1 discloses an exhaust gas purifying catalyst in which an entire honeycomb carrier is coated by a Pd layer and the Pd layer is coated by an Rh layer. Patent Literature 1 proposes an improvement in NOx purification performance by providing the Pd layer with a front portion and a rear portion and setting a ratio of amounts of oxygen-releasing materials of the front portion to the rear portion so as to satisfy 'front portion'>'rear portion'.

CITATION LIST

Patent Literature

Patent Literature 1: Japanese Patent Application Laid-open No. 2011-212639
Patent Literature 2: Japanese Patent Application Laid-open No. 2010-167381

SUMMARY OF INVENTION

Technical Problem

Generally, an exhaust gas purifying catalyst has a disadvantage in that, when exhaust gas temperature is still low such as immediately after starting an engine, the purification performance of the catalyst declines due to insufficient warming of the exhaust gas purifying catalyst. In particular, since low-temperature exhaust gas contains a large amount of HC (cold HC) which is unburned matter in fuel, there is a need for an exhaust gas purifying catalyst capable of producing favorable cold HC purification performance in a low-temperature state immediately after starting an engine. In addition, when catalyst temperature has risen sufficiently after starting the engine, when the engine is under a high load, or when the engine is restarted, a large amount of NOx (hot NOx) tends to be discharged from the engine. Therefore, there is a need for an exhaust gas purifying catalyst capable of producing favorable hot NOx purification performance during a high-load operation or during restart. In other words, there is a need for an exhaust gas purifying catalyst capable of realizing both cold HC purification performance and hot NOx purification performance at high levels.

The present invention has been made in consideration of such circumstances, and a main object thereof is to provide an exhaust gas purifying catalyst which has an upper and lower two-layer structure and which is capable of realizing both cold HC purification performance and hot NOx purification performance at high levels.

As a result of intensive studies carried out in order to solve the problems described above, the present inventors recognized that providing a Ce-free layer in a front portion of a lower layer in an exhaust gas purifying catalyst having an upper and lower two-layer structure improves cold HC purification performance and discovered that both cold HC purification performance and hot NOx purification performance can be realized at high levels by further having a rear portion of the lower layer contain a Ce-containing oxide with a pyrochlore structure, and thereby accomplished the present invention.

Specifically, the exhaust gas purifying catalyst provided by the present invention is arranged inside an exhaust passage of an internal combustion engine and purifies NOx contained in exhaust gas, and includes a base material and a catalyst-coated layer formed on a surface of the base material. The catalyst-coated layer is formed in a laminate structure having upper and lower layers, with a layer closer to the base material surface being the lower layer and a layer relatively farther from the base material surface being the upper layer. The upper layer contains Rh and/or Pt as a noble metal catalyst, and a Ce-containing oxide. The lower layer contains Pd as a noble metal catalyst. The lower layer is provided with, in a circulation direction of the exhaust gas, a front-stage lower layer positioned on an upstream side and a rear-stage lower layer positioned on a downstream side. The front-stage lower layer is a Ce-free layer that does not contain a Ce-containing oxide. In addition, the rear-stage lower layer is a Ce-containing layer that contains a Ce-containing oxide with a pyrochlore structure.

According to this configuration, providing a Ce-free layer that does not contain a Ce-containing oxide in a front portion of the lower layer in which Pd is disposed effectively improves warming performance of a catalyst. Therefore, high catalytic activity is exhibited even in a low-temperature state immediately after starting an engine and cold HC in exhaust gas can be favorably purified. In addition, while providing a Ce-free layer in a front portion of the lower layer to realize favorable cold HC purification performance may contrarily cause hot NOx purification performance to decline, according to the configuration of the present invention, having a rear portion of the lower layer contain a Ce-containing oxide with a pyrochlore structure can effectively suppress a decline in the hot NOx purification performance. Therefore, the present invention can provide an optimal exhaust gas purifying catalyst with improved cold HC purification performance while suppressing emission of hot NOx.

In a preferable aspect of an exhaust gas purifying catalyst disclosed herein, an amount of Ce in the Ce-containing oxide with a pyrochlore structure in the rear-stage lower layer is 10 g/L to 20 g/L in terms of $CeO_2$ per liter of a volume of the base material. When the amount of Ce in the Ce-containing oxide with a pyrochlore structure included in the rear-stage lower layer is within such a range, both hot NOx purification performance and cold HC purification performance can be realized in a more preferable manner.

In a preferable aspect of an exhaust gas purifying catalyst disclosed herein, the rear-stage lower layer further contains a Ce-containing oxide with a non-pyrochlore structure. A Ce-containing oxide with a non-pyrochlore structure has a higher oxygen storage rate than a Ce-containing oxide with a pyrochlore structure. Therefore, having the rear-stage lower layer contain a Ce-containing oxide having a non-pyrochlore structure with a high oxygen storage rate enables an oxygen storage/release capacity (an atmosphere mitigation capacity) of a suitable speed to be exhibited during a high-load operation and enables NOx emissions to be suppressed more effectively.

In a preferable aspect of an exhaust gas purifying catalyst disclosed herein, when a sum of amounts of Ce of the Ce-containing oxide with a pyrochlore structure and the Ce-containing oxide with a non-pyrochlore structure in the rear-stage lower layer is used as a base of 100% by mass, the amount of Ce in the Ce-containing oxide with a pyrochlore structure is 10% by mass to 30% by mass. While a Ce-containing oxide with a non-pyrochlore structure which has a relatively high oxygen storage rate effectively contributes to the purification of hot NOx during a high-load operation, a Ce-containing oxide with a pyrochlore structure which has a relatively low oxygen storage rate effectively contributes to the purification of hot NOx during a restart. According to the configuration described above, since a ratio of a Ce-containing oxide with a pyrochlore structure to a Ce-containing oxide with a non-pyrochlore structure is suitably balanced, both hot NOx purification performance during a high-load operation and hot NOx purification performance during a restart can be realized at high levels and the effect described above can be exhibited in a more preferable manner.

In a preferable aspect of an exhaust gas purifying catalyst disclosed herein, a sum of amounts of Ce of the Ce-containing oxide with a pyrochlore structure and the Ce-containing oxide with a non-pyrochlore structure in the rear-stage lower layer is 60 g/L to 70 g/L in terms of $CeO_2$ per liter of the volume of the base material. When the amount of Ce contained in the rear-stage lower layer is within such a range, both hot NOx purification performance and cold HC purification performance can be realized at higher levels.

In a preferable aspect of an exhaust gas purifying catalyst disclosed herein, the front-stage lower layer is formed in a portion corresponding to at least 30% of a length of the base material from an end on an exhaust gas inlet side toward an exhaust gas outlet side of the base material. In addition, the rear-stage lower layer is formed in a portion corresponding to at least 30% of a length of the base material from an end on the exhaust gas outlet side toward the exhaust gas inlet side of the base material. When the front-stage lower layer and the rear-stage lower layer are within such length ranges, both an improvement in hot NOx purification performance and an improvement in cold HC purification performance can be achieved at higher levels.

In a preferable aspect of an exhaust gas purifying catalyst disclosed herein, an amount of Ce in the Ce-containing oxide in the upper layer is 10 g/L to 20 g/L in terms of $CeO_2$ per liter of a volume of the base material. When the amount of Ce contained in the upper layer is within such a range, the effects described above can be more favorably exhibited.

In a preferable aspect of an exhaust gas purifying catalyst disclosed herein, the Ce-containing oxide is a ceria-zirconia composite oxide. Since a ceria-zirconia composite oxide has a high oxygen storage/release capacity (atmosphere mitigation capacity), a ceria-zirconia composite oxide can be preferably used as a Ce-containing oxide suitable for the object of the present invention.

DESCRIPTION OF EMBODIMENTS

Hereinafter, a preferred embodiment of the present invention will be described with reference to the drawings. It should be noted that matters required to carry out the present invention (for example, general matters related to an arrangement of an exhaust gas purifying catalyst), with the exception of matters specifically mentioned in the present specification (for example, a composition of a porous carrier), can be understood to be design matters of a person with ordinary skill in the art based on the prior art in the relevant technical field. The present invention can be carried out based on the contents disclosed in the present specification and on common general technical knowledge in the relevant field. Moreover, in the following description, exhaust gases with a lean air fuel ratio, a stoichiometric air fuel ratio, and a rich air fuel ratio refer to exhaust gases having an air fuel ratio equivalent to an air fuel ratio of exhaust gases discharged from an internal combustion engine or exhaust gases obtained by post-supplying hydrocarbon to the exhaust gases discharged from the internal combustion engine when a lean mixed gas, a stoichiometric mixed gas, and a rich mixed gas are respectively burned in the internal combustion engine.

The exhaust gas purifying catalyst disclosed herein is constituted by a base material and a catalyst-coated layer formed on a surface of the base material, and the catalyst-coated layer is formed in a laminate structure.

Figure 1:
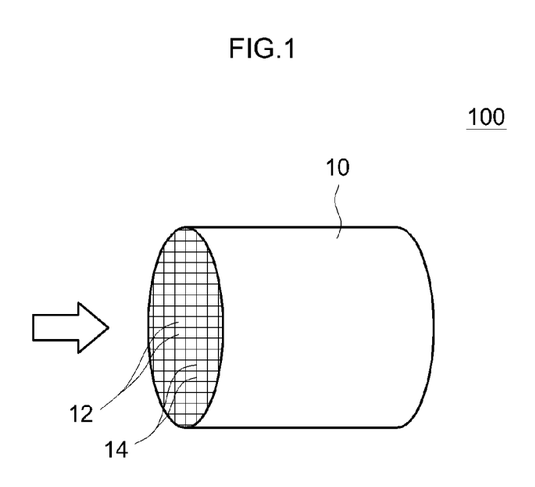
FIG. 1 is an explanatory diagram of a schematic configuration of an exhaust gas purifying catalyst according to an embodiment of the present invention.

FIG. 1 is a schematic view of a typical example of an exhaust gas purifying catalyst. An exhaust gas purifying catalyst 100 according to the present embodiment is provided with a honeycomb base material 10 including a plurality of regularly-arrayed cells 12 and a rib wall 14 constituting the cells 12.

As the base material 10 constituting the exhaust gas purifying catalyst 100 disclosed herein, base materials of various materials and shapes conventionally used for applications of this type can be used. For example, a honeycomb base material provided with a honeycomb structure made of a ceramic such as cordierite and silicon carbide (SiC) or an alloy (stainless steel or the like) can be preferably adopted. As an example, a honeycomb base material with a cylindrical outer shape is provided with through holes (cells) as exhaust gas passages in a cylinder axial direction thereof, in which exhaust gas can come into contact with partitions (rib walls) that divide the respective cells. In addition to a honeycomb shape, the base material may be given a foam shape, a pellet shape, and the like. Furthermore, an elliptical cylindrical shape, a polygonal cylindrical shape, or the like may be adopted as an overall outer shape of the base material in place of a cylindrical shape. Moreover, in the present specification, a volume (an inner volume) of the base material 10 refers to a bulk volume including an internal void (cell) volume (in other words, including the catalyst-coated layer formed in the void (cells)) in addition to a net inner volume of the base material.

<Catalyst-Coated Layer>

Figure 2:
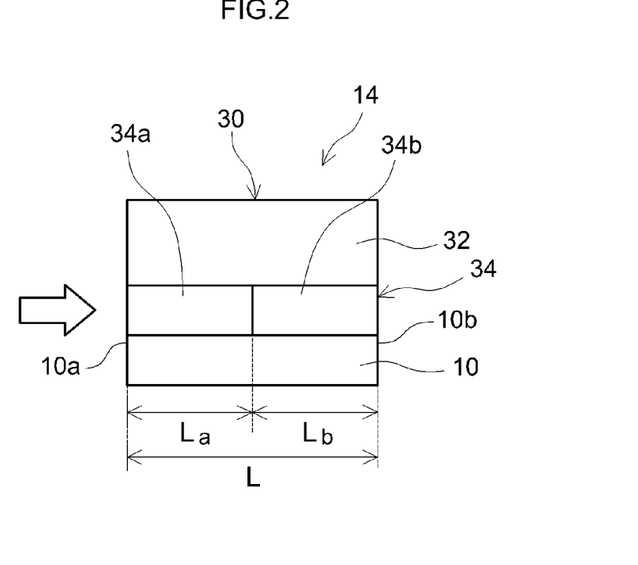
FIG. 2 is a diagram schematically showing a configuration of a rib wall portion of an exhaust gas purifying catalyst according to an embodiment of the present invention.

FIG. 2 is a diagram schematically showing a configuration of a surface portion of the rib wall 14 in the honeycomb base material 10 shown in FIG. 1. The rib wall 14 is provided with the base material 10 and a catalyst-coated layer 30 with a two-layer structure formed on a surface of the base material 10. The catalyst-coated layer 30 with a two-layer structure is formed in a laminate structure having at least two layers, with a layer closer to the surface of the base material 10 being a lower layer 34 and a layer relatively farther from the surface of the base material 10 being an upper layer 32. According to a technique disclosed herein, the upper layer 32 contains Rh (rhodium) and/or Pt (platinum) as a noble metal catalyst. In addition, the lower layer 34 contains Pd (palladium) as a noble metal catalyst. Furthermore, the lower layer 34 is provided with, in a circulation direction of exhaust gas (refer to arrow in FIG. 2), a front-stage lower layer 34a positioned on an upstream side and a rear-stage lower layer 34b positioned on a downstream side.

<Front-Stage Lower Layer>

The front-stage lower layer 34a constituting a front portion (an upstream-side portion) of the lower layer 34 disclosed herein contains Pd as a noble metal catalyst and a carrier that carries the Pd. The front-stage lower layer 34a is a Ce-free layer that does not contain a Ce-containing oxide (an oxide containing cerium). By providing the Ce-free layer 34a that does not contain a Ce-containing oxide in the front portion of the lower layer 34 in which Pd is disposed in this manner, warming performance of the catalyst is effectively improved. Therefore, high catalytic activity is exhibited even in a low-temperature state immediately after starting an engine and cold HC in exhaust gas can be favorably purified.

The carrier that carries Pd of the front-stage lower layer 34a disclosed herein may be a metal oxide (hereinafter, referred to as a non-Ce-containing oxide) other than a Ce-containing oxide. As the non-Ce-containing oxide, a metal oxide which is porous and which has superior heat resistance is favorably used. Examples thereof include aluminum oxide (alumina: $Al_2O_3$), zirconium oxide (zirconia: $ZrO_2$), and solid solutions thereof. In particular, $Al_2O_3$ is favorably used. $Al_2O_3$ has a large surface area and high endurance (in particular, heat resistance). Therefore, by having $Al_2O_3$ carry Pd, thermal stability is improved and Pd can be carried in a suitable amount. While a content of the carrier in the front-stage lower layer 34a is not particularly limited, for example, the content is favorably 40 g to 200 g (for example, 40 g to 100 g, favorably 50 g to 100 g, and typically 60 g to 80 g) per liter of the volume of the base material.

Barium (Ba) may be added to the carrier that carries Pd of the front-stage lower layer 34a disclosed herein. Adding Ba to the carrier of the front-stage lower layer 34a, suppresses HC poisoning of Pd and improves catalytic activity (in particular, low-temperature activity). In addition, dispersibility of Pd with respect to the carrier is improved and sintering that accompanies grain growth of Pd at high temperatures can be more favorably suppressed. As the carrier disclosed herein, a carrier of which an additive amount of the Ba satisfies 10 parts by mass to 50 parts by mass with respect to 100 parts by mass of the carrier in terms of barium sulfate is favorable, a carrier of which the additive amount of the Ba satisfies 15 parts by mass to 40 parts by mass is more favorable, and a carrier of which the additive amount of the Ba satisfies 25 parts by mass to 35 parts by mass is even more favorable. Setting the content of Ba within this range enables high catalytic activity to be exhibited even immediately after starting the engine. While a content of barium in the front-stage lower layer 34a is not particularly limited, for example, the content is favorably 5 g to 50 g (preferably, 10 g to 30 g, and typically 15 g to 25 g) per liter of the volume of the base material.

Other material (typically, an inorganic oxide) may be added as an accessory component to the front-stage lower layer 34a. Examples of a substance that may be added to the catalyst layer include a rare earth element such as lanthanum (La) and yttrium (Y), an alkaline-earth element such as calcium, and other transition metal elements. Among the above, since a rare earth element such as lanthanum and yttrium is capable of improving a specific surface area at a high temperature without inhibiting catalyst functions, a rare earth element is preferably used as a stabilizing agent. In addition, a content ratio of these accessory components is favorably set equal to or lower than 20 parts by mass (favorably equal to or lower than 10 parts by mass) with respect to 100 parts by mass of the non-Ce-containing oxide.

The Pd contained in the front-stage lower layer 34a disclosed herein is carried by a carrier made of the non-Ce-containing oxide described above. While a carried amount of Pd is not particularly limited, the carried amount is suitably set to a range of 0.1 parts by mass to 10 parts by mass (for example, 0.5 parts by mass to 5 parts by mass, and favorably 1 part by mass to 3 parts by mass) with respect to 100 parts by mass of the carrier contained in the front-stage lower layer 34a. A smaller amount prevents sufficient catalytic activity from being produced, while a larger amount causes an effect to be saturated and is disadvantageous in terms of cost. While a content of Pd in the front-stage lower layer 34a is not particularly limited, for example, the content is favorably 0.1 g to 10 g (favorably 0.5 g to 10 g, and typically 1 g to 3 g) per liter of the volume of the base material. A method by which the carrier of the front-stage lower layer 34a carries Pd is not particularly limited. For example, a preparation may be provided by impregnating a water-based solution containing a palladium salt (for example, a nitrate) or a palladium complex (for example, a tetraamine complex) with a non-Ce-containing oxide powder, and subsequently drying and firing the powder-impregnated water-based solution.

The front-stage lower layer 34a disclosed herein may contain other noble metal catalysts in an amount that does not inhibit performance of Pd. Examples of a noble metal catalyst other than Pd include ruthenium (Ru), iridium (Ir), and Osmium (Os).

While an amount of formation (a coating amount) of the front-stage lower layer 34a is not particularly limited, for example, the amount is favorably around 40 g to 200 g (typically, 60 g to 100 g) per liter of the volume of the base material. An excessively small amount of formation of the front-stage lower layer 34a may impair functions as a catalyst-coated layer. In addition, an excessively large amount of formation of the front-stage lower layer 34a may cause pressure loss to rise when exhaust gas passes through the cells of the base material.

In a preferable aspect, the front-stage lower layer 34a is formed in a portion corresponding to at least 30% of a length (a total length) L of the base material 10 (at most, 70% or less, in other words, La=0.3 L to 0.7 L) from an end on an exhaust gas inlet side (an upstream end) 10a toward an exhaust gas outlet side (a downstream side) of the base material 10. In the illustrated example, the front-stage lower layer 34a is formed in a portion (La=1/2 L) corresponding to 50% of the total length L of the base material 10 from the end 10a on the exhaust gas inlet side toward the exhaust gas outlet side of the base material 10. By making a portion corresponding to at least 30% of the total length L of the base material 10 from the end 10a on the exhaust gas inlet side toward the exhaust gas outlet side of the base material 10 the front-stage lower layer (in other words, the Ce-free layer) 34a, warming performance of the catalyst is effectively improved and high cold HC purification performance can be more reliably exhibited immediately after starting the engine.

<Rear-Stage Lower Layer>

The rear-stage lower layer 34b constituting a rear portion (a downstream-side portion) of the lower layer 34 disclosed herein is a Ce-containing layer which contains a Ce-containing oxide with a pyrochlore structure and which contains Pd as a noble metal catalyst. By providing the Ce-containing layer 34b which contains a Ce-containing oxide with a pyrochlore structure in the rear portion of the lower layer 34 in this manner, both cold HC purification performance and hot NOx purification performance can be realized at high levels. While a reason why such an effect is produced should not be particularly narrowly interpreted, for example, a conceivable reason is as follows. When the Ce-free layer 34a is provided in the front portion of the lower layer 34 as described above, while cold HC purification performance increases, an oxygen storage/release capacity (an atmosphere mitigation capacity) may contrarily become insufficient and hot NOx purification performance may decline. By contrast, having the rear portion of the lower layer 34 contain a Ce-containing oxide with a pyrochlore structure which has a high oxygen storage/release capacity, the oxygen storage/release capacity can be suitably exhibited even during a high-load operation and during a restart (for example, immediately after a fuel cut (F/C)) and a decline in hot NOx purification performance can be effectively suppressed. Therefore, the present aspect can realize an optimal exhaust gas purifying catalyst with improved cold HC purification performance while suppressing emission of hot NOx.

Examples of the Ce-containing oxide with a pyrochlore structure include a $CeO_2$ (ceria)-containing oxide with a pyrochlore structure. In particular, a ceria-zirconia composite oxide (a $CeO_2$—$ZrO_2$ composite oxide) with a pyrochlore structure is favorably used. In this case, a pyrochlore structure refers to a structure expressed by $A_2B_2O_7$ when B denotes a transition metal element, which is a type of a crystalline structure constituted by a combination of $A^{3+}/B^{4+}$ or $A^{2+}/B^{5+}$ and which occurs when an ionic radius of A is relatively small in the crystalline structure constituted by the combination. When a ceria-zirconia composite oxide is used as the Ce-containing oxide, a chemical formula of the ceria-zirconia composite oxide with a pyrochlore structure is expressed by $Ce_2Zr_2O_7$, in which Ce and Zr are alternately and regularly arrayed across oxygen. Since a Ce-containing oxide with such a pyrochlore structure has a higher oxygen storage/release capacity (atmosphere mitigation capacity) than Ce-containing oxides with other crystalline structures, the effect described earlier can be suitably exhibited. While an amount of Ce of the Ce-containing oxide with a pyrochlore structure in the rear-stage lower layer 34b is not particularly limited, from the perspectives of suppressing emission of hot NOx and the like, for example, the amount of Ce is 5 g/L to 25 g/L, favorably 10 g/L to 20 g/L, and more favorably 12 g/L to 18 g/L in terms of $CeO_2$ per liter of volume of the base material. The technique disclosed herein can be favorably implemented in an aspect where the amount of Ce of the Ce-containing oxide with a pyrochlore structure in the rear-stage lower layer 34b is 10 g/L to 20 g/L.

When the Ce-containing oxide with a pyrochlore structure is a ceria-zirconia composite oxide, a mixing ratio of $CeO_2$ to $ZrO_2$ in the ceria-zirconia composite oxide may be $CeO_2$: $ZrO_2$=40:60 to 80:20 and favorably 50:50 to 60:40. When the mixing ratio of $CeO_2$ is within such a range, high catalytic activity and a high OSC (oxygen storage/release capacity) can be realized in the rear-stage lower layer 34b containing Pd. While an amount of the ceria-zirconia composite oxide with a pyrochlore structure in the rear-stage lower layer 34b is not particularly limited, from the perspectives of suppressing emission of hot NOx and the like, for example, the amount is 5 g to 50 g, favorably 10 g to 40 g, and more favorably 20 g to 30 g per liter of volume of the base material.

The rear-stage lower layer 34b may further contain a Ce-containing oxide with a non-pyrochlore structure. In other words, a Ce-containing oxide having a pyrochlore structure and a Ce-containing oxide having a crystalline structure other than a pyrochlore structure may coexist. Examples of the Ce-containing oxide with a non-pyrochlore structure include a $CeO_2$ (ceria)-containing composite oxide with a fluorite type structure. In particular, a ceria-zirconia composite oxide (a $CeO_2$—$ZrO_2$ composite oxide) with a fluorite type structure is favorably used. In a preferable aspect, both the Ce-containing oxide with a pyrochlore structure and the Ce-containing oxide with a non-pyrochlore structure coexisting in the rear-stage lower layer 34b are constituted by a same composite oxide (favorably, a ceria-zirconia composite oxide) and only differ from each other in their crystalline structures. A Ce-containing oxide with a non-pyrochlore structure has a higher oxygen storage rate than a Ce-containing oxide with a pyrochlore structure. Therefore, containing a Ce-containing oxide having a non-pyrochlore structure with a relatively high oxygen storage rate enables an oxygen storage/release capacity (an atmosphere mitigation capacity) of a suitable speed to be exhibited during a high-load operation and enables hot NOx emissions to be suppressed. While an amount of Ce of the Ce-containing oxide with a non-pyrochlore structure in the rear-stage lower layer 34b is not particularly limited, from the perspectives of increasing an NOx purification capacity during a high-load operation, for example, the amount of Ce is 30 g to 80 g, favorably 40 g to 70 g, and more favorably 45 g to 60 g in terms of $CeO_2$ per liter of volume of the base material.

When the Ce-containing oxide with a non-pyrochlore structure is a ceria-zirconia composite oxide, a mixing ratio of $CeO_2$ to $ZrO_2$ in the ceria-zirconia composite oxide may be $CeO_2:ZrO_2$=20:80 to 80:20, favorably 40:60 to 75:25, and more favorably 55:45 to 70:30. When the mixing ratio of $CeO_2$ is within such a range, high catalytic activity and a high OSC (oxygen storage/release capacity) can be realized in the rear-stage lower layer 34b containing Pd. While an amount of the ceria-zirconia composite oxide with a non-pyrochlore structure in the rear-stage lower layer 34b is not particularly limited, from the perspectives of suppressing emission of hot NOx and the like, for example, the amount is 80 g to 180 g, favorably 100 g to 140 g, and more favorably 110 g to 130 g per liter of volume of the base material.

From the perspective of more favorably exhibiting the effect of using both a Ce-containing oxide with a pyrochlore structure and a Ce-containing oxide with a non-pyrochlore structure, when a sum of amounts of Ce of the Ce-containing oxide with a pyrochlore structure and the Ce-containing oxide with a non-pyrochlore structure in the rear-stage lower layer is used as a base of 100% by mass, the amount of Ce in the Ce-containing oxide with a pyrochlore structure is favorably 1% by mass to 40% by mass. While a Ce-containing oxide with a non-pyrochlore structure which has a relatively high oxygen storage rate effectively contributes to the purification of hot NOx during a high-load operation, a Ce-containing oxide with a pyrochlore structure which has a relatively low oxygen storage rate effectively contributes to the purification of hot NOx during a restart. According to the configuration described above, since a ratio of a Ce-containing oxide with a pyrochlore structure to a Ce-containing oxide with a non-pyrochlore structure in the rear-stage lower layer 34b is suitably balanced, both hot NOx purification performance during a high-load operation and hot NOx purification performance during a restart can be produced and the effect described above can be realized at a higher level. The technique disclosed herein can be favorably implemented in an aspect where, for example, a proportion of the amount of Ce of the Ce-containing oxide with a pyrochlore structure to a total amount of Ce contained in the rear-stage lower layer 34b is 10% by mass to 30% by mass (for example, 10% by mass to 25% by mass and, typically, 12% by mass to 20% by mass). While a total amount of Ce of the Ce-containing oxide with a pyrochlore structure and the Ce-containing oxide with a non-pyrochlore structure in the rear-stage lower layer 34b is not particularly limited, from the perspective of a hot NOx purification capacity, for example, the total amount of Ce is 40 g to 80 g, favorably 50 g to 70 g, and more favorably 60 g to 70 g in terms of $CeO_2$ per liter of volume of the base material. The technique disclosed herein can be favorably implemented in an aspect where the total amount of Ce contained in the rear-stage lower layer 34b is 60 g/L to 70 g/L.

A metal oxide (a non-Ce-containing oxide) other than a Ce-containing oxide may coexist in the rear-stage lower layer 34b disclosed herein. Examples of such a non-Ce-containing oxide include aluminum oxide (alumina: $Al_2O_3$), zirconium oxide (zirconia: $ZrO_2$), and solid solutions thereof. In particular, $Al_2O_3$ is favorably used. $Al_2O_3$ and the Ce-containing oxide are favorably mixed in a mass mixing ratio ($Al_2O_3$:Ce-containing oxide) range of 5:95 to 50:50 (typically, 10:90 to 20:80). While a content of the non-Ce-containing oxide in the rear-stage lower layer 34b is not particularly limited, for example, the content is favorably 5 g to 50 g (favorably 10 g to 40 g, and typically 15 g to 30 g) per liter of the volume of the base material.

Barium (Ba) may be added to the Ce-containing oxide and the non-Ce-containing oxide in the rear-stage lower layer 34b disclosed herein. An additive amount of the Ba favorably satisfies 0.1 parts by mass to 10 parts by mass, more favorably satisfies 0.5 parts by mass to 5 parts by mass, and even more favorably satisfies 1 part by mass to 3 parts by mass with respect to 100 parts by mass of a total amount of the Ce-containing oxide and the non-Ce-containing oxide in terms of barium sulfate. While a content of barium in the rear-stage lower layer 34b is not particularly limited, for example, the content is favorably 0.1 g/L to 15 g/L (favorably 0.5 g/L to 5 g/L, and typically 1 g/L to 3 g/L) per liter of the volume of the base material.

Other material (typically, an inorganic oxide) may be added as an accessory component to the rear-stage lower layer 34b. Examples of a substance that may be added to the catalyst layer include a rare earth element such as lanthanum (La) and yttrium (Y), an alkaline-earth element such as calcium, and other transition metal elements. Among the above, since a rare earth element such as lanthanum and yttrium is capable of improving a specific surface area at a high temperature without inhibiting catalyst functions, a rare earth element is preferably used as a stabilizing agent. In addition, a content ratio of these accessory components is favorably set equal to or lower than 20 parts by mass (favorably equal to or lower than 10 parts by mass) with respect to 100 parts by mass of the Ce-containing oxide.

The Pd contained in the rear-stage lower layer 34b disclosed herein is carried by at least one of the Ce-containing oxide and the non-Ce-containing oxide described above. While a carried amount of Pd is not particularly limited, the carried amount is suitably set to a range of 0.01 parts by mass to 0.5 parts by mass (for example, 0.03 parts by mass to 0.3 parts by mass, and favorably 0.05 parts by mass to 0.1 parts by mass) with respect to 100 parts by mass of the total amount of the Ce-containing oxide and the non-Ce-containing oxide contained in the rear-stage lower layer 34b. While a content of Pd in the rear-stage lower layer 34b is not particularly limited, for example, the content is favorably 0.01 g/L to 1 g/L (favorably 0.05 g/L to 0.5 g/L, and typically 0.1 g/L to 0.3 g/L) per liter of the volume of the base material.

In a preferable aspect, a mass ratio (rear-stage lower layer/front-stage lower layer) of Pd disposed in the rear-stage lower layer 34b to Pd disposed in the front-stage lower layer 34a is equal to or lower than 0.1 (for example, 0.001 to 0.1). Setting the mass ratio of Pd in the range described above enables higher catalytic activity to be exhibited. The mass ratio of Pd is favorably equal to or lower than 0.05 and more favorably equal to or lower than 0.01 (for example, 0.001 to 0.01). The technique disclosed herein can be favorably implemented in an aspect where, for example, a mass ratio of Pd disposed in the rear-stage lower layer 34b to Pd disposed in the front-stage lower layer 34a is 0.003 to 0.008.

The rear-stage lower layer 34b disclosed herein may contain other noble metal catalysts in an amount that does not inhibit performance of Pd. Examples of a noble metal catalyst other than Pd include ruthenium (Ru), iridium (Ir), and Osmium (Os).

While an amount of formation (a coating amount) of the rear-stage lower layer 34b is not particularly limited, for example, the amount is favorably around 80 g/L to 300 g/L (typically, 100 g/L to 250 g/L and, for example, 120 g/L to 200 g/L) per liter of the volume of the base material. An excessively small amount of formation of the rear-stage lower layer 34b may impair functions as a catalyst-coated layer. In addition, an excessively large amount of formation of the rear-stage lower layer 34b may cause pressure loss to rise when exhaust gas passes through cells of the honeycomb base material 10.

In a preferable aspect, the rear-stage lower layer 34b is formed in a portion corresponding to at least 30% of the length (the total length) L of the base material 10 (at most, 70% or less, in other words, Lb=0.3 L to 0.7 L) from an end on the exhaust gas outlet side (a downstream end) 10b toward the exhaust gas inlet side (the upstream side) of the base material 10. In the illustrated example, the rear-stage lower layer 34b is formed in a portion (Lb=1/2 L) corresponding to 50% of the total length L of the base material 10 from the end 10b on the exhaust gas outlet side toward the exhaust gas inlet side of the base material 10. By making a portion corresponding to at least 30% of the total length L of the base material 10 from the end 10b on the exhaust gas outlet side toward the exhaust gas inlet side of the base material 10 the rear-stage lower layer (in other words, the Ce-containing layer) 34b, an oxygen storage/release capacity (an atmosphere mitigation capacity) can be increased to more effectively suppress hot NOx emission.

<Upper Layer>

The upper layer 32 constituting the catalyst-coated layer disclosed herein contains at least one of Rh and Pt as a noble metal catalyst and a carrier that carries the noble metal catalyst.

The carrier that carries the noble metal catalyst of the upper layer 32 disclosed herein may be a Ce-containing oxide. Examples of a Ce-containing oxide include $CeO_2$ (ceria) and a $CeO_2$-containing composite oxide that contains ceria. In particular, a ceria-zirconia composite oxide (a $CeO_2$—$ZrO_2$ composite oxide) is favorably used. Having the upper layer 32 in addition to the rear-stage lower layer 34b contain a Ce-containing oxide enables an oxygen storage/release capacity (an atmosphere mitigation capacity) to be suitably exhibited when subjected to a high load and enables hot NOx emissions to be suppressed more effectively. While an amount of Ce of the Ce-containing oxide in the upper layer 32 is not particularly limited, from the perspectives of suppressing emission of hot NOx and the like, for example, the amount of Ce is approximately 1 g/L to 30 g/L, favorably 5 g/L to 25 g/L, more favorably 10 g/L to 20 g/L, and even more favorably 12 g/L to 18 g/L in terms of $CeO_2$ per liter of volume of the base material. The technique disclosed herein can be favorably implemented in an aspect where the amount of Ce contained in the upper layer 32 is 10 g/L to 20 g/L.

From the perspective of more favorably exhibiting the effect of having both the upper layer 32 and the rear-stage lower layer 34b contain a Ce-containing oxide, a mass ratio (rear-stage lower layer/upper layer) of Ce contained in the rear-stage lower layer 34b to Ce contained in the upper layer 32 is suitably set approximately equal to or higher than 2, favorably equal to or higher than 2.5, and more favorably equal to or higher than 3. While a lower limit of the mass ratio of Ce is not particularly limited, from the perspective of more favorably exhibiting functions as a catalyst, the mass ratio of Ce is suitably set approximately equal to or lower than 10, favorably equal to or lower than 7, and more favorably equal to or lower than 5 (for example, equal to or lower than 4). By having both the upper layer and the rear-stage lower layer contain a Ce-containing oxide so that such a mass ratio is attained, an atmosphere mitigation capacity can be effectively increased and a higher hot NOx purification rate can be achieved. The technique disclosed herein can be favorably implemented in an aspect where the mass ratio of Ce contained in the rear-stage lower layer 34b to Ce contained in the upper layer 32 is 2.5 to 5.

When the Ce-containing oxide is a ceria-zirconia composite oxide, a mixing ratio of $CeO_2$ to $ZrO_2$ in the ceria-zirconia composite oxide may be $CeO_2$:$ZrO_2$=5:95 to 80:20, favorably 10:90 to 50:50, and more favorably 15:85 to 30:70. When the mixing ratio of $CeO_2$ is within such a range, high catalytic activity and a high OSC (oxygen storage/release capacity) can be realized in the upper layer 32 containing Rh and/or Pt. While an amount of the ceria-zirconia composite oxide in the upper layer 32 is not particularly limited, from the perspectives of suppressing emission of hot NOx and the like, for example, the amount is 40 g/L to 120 g/L, favorably 60 g/L to 100 g/L, and more favorably 70 g/L to 90 g/L per liter of volume of the base material.

A metal oxide (a non-Ce-containing oxide) other than a Ce-containing oxide may coexist in the upper layer 32 disclosed herein. Examples of such a non-Ce-containing oxide include aluminum oxide (alumina: $Al_2O_3$), zirconium oxide (zirconia: $ZrO_2$), and solid solutions thereof. In particular, $Al_2O_3$ is favorably used. $Al_2O_3$ and the Ce-containing oxide are favorably mixed in a mass mixing ratio ($Al_2O_3$:Ce-containing oxide) range of 10:90 to 50:50 (typically, 20:80 to 30:70). While a content of the non-Ce-containing oxide in the upper layer 32 is not particularly limited, for example, the content is favorably 5 g/L to 50 g/L (favorably 10 g/L to 40 g/L, and typically 15 g/L to 30 g/L) per liter of the volume of the base material.

Other material (typically, an inorganic oxide) may be added as an accessory component to the upper layer 32. Examples of a substance which can be added to the catalyst layer include a rare earth element such as lanthanum (La) and yttrium (Y), an alkaline-earth element such as calcium, and other transition metal elements. Among the above, since a rare earth element such as lanthanum and yttrium is capable of improving a specific surface area at a high temperature without inhibiting catalyst functions, a rare earth element is preferably used as a stabilizing agent. In addition, a content ratio of these accessory components is favorably set equal to or lower than 20 parts by mass (favorably equal to or lower than 10 parts by mass) with respect to 100 parts by mass of the Ce-containing oxide.

Rh and/or Pt contained in the upper layer 32 disclosed herein are carried by the Ce-containing oxide described earlier. While a carried amount of Rh and/or Pt is not particularly limited, the carried amount is suitably set to a range of 0.05 parts by mass to 2 parts by mass (for example, 0.1 parts by mass to 1 part by mass, and favorably 0.2 parts by mass to 0.5 parts by mass) with respect to 100 parts by mass of the Ce-containing oxide contained in the upper layer 32. While a content of Rh and/or Pt in the upper layer 32 is not particularly limited, for example, the content is favorably 0.01 g/L to 1 g/L (favorably 0.05 g/L to 0.5 g/L, and typically 0.1 g/L to 0.3 g/L) per liter of the volume of the base material.

In a preferable aspect, the upper layer 32 contains Rh as a noble metal catalyst. In this case, a mass ratio (Pd/Rh) of Pd disposed in the lower layer 34 (in other words, the front-stage lower layer 34a and the rear-stage lower layer 34b) to Rh disposed in the upper layer 32 is equal to or higher than 10 (for example, 10 to 40). Setting the mass ratio of Pd/Rh to the range described above enables harmful gas in exhaust gas to be more favorably purified. The mass ratio of Pd/Rh is favorably equal to or higher than 15 and more favorably equal to or higher than 20. The technique disclosed herein can be favorably implemented in an aspect where, for example, a mass ratio of Pd disposed in the lower layer 34 to Rh disposed in the upper layer 32 is 10 to 30 (typically, 15 to 25).

The upper layer 32 disclosed herein may contain other noble metal catalysts in an amount that does not inhibit performances of Rh and/or Pt. Examples of a noble metal catalyst other than Pd include ruthenium (Ru), iridium (Ir), and Osmium (Os).

While an amount of formation (a coating amount) of the upper layer 32 is not particularly limited, for example, the amount is favorably around 50 g/L to 180 g/L (typically, 75 g/L to 150 g/L and, for example, 90 g/L to 120 g/L) per liter of the volume of the base material. An excessively small amount of formation of the upper layer 32 may impair functions as a catalyst-coated layer. In addition, an excessively large amount of formation of the upper layer 32 may cause pressure loss to rise when exhaust gas passes through cells of the honeycomb base material 10.

<Formation Method of Catalyst-Coated Layer>

The lower layer 34 of the catalyst-coated layer 30 may be formed so that the front-stage lower layer 34a and the rear-stage lower layer 34b are respectively formed based on different slurries. For example, a front-stage lower layer-forming slurry for forming the front-stage lower layer 34a and a rear-stage lower layer-forming slurry for forming the rear-stage lower layer 34b may be prepared. The front-stage lower layer-forming slurry contains a non-Ce-containing oxide carrying Pd and another front-stage lower layer constituent (for example, barium). The rear-stage lower layer-forming slurry contains Pd, a Ce-containing oxide with a pyrochlore structure, and another rear-stage lower layer constituent (for example, a Ce-containing oxide with a non-pyrochlore structure, a non-Ce-containing oxide, or barium). A portion of the base material 10 in which the front-stage lower layer 34a is to be formed is washcoated by the front-stage lower layer-forming slurry to form a portion of the lower layer 34 on the surface of the base material 10. This portion becomes the front-stage lower layer 34a of the lower layer 34. In addition, a remaining portion of the base material 10 in a lengthwise direction is washcoated by the rear-stage lower layer-forming slurry to form a remaining portion of the lower layer 34 on the surface of the base material 10. This remaining portion becomes the rear-stage lower layer 34b of the lower layer 34. Furthermore, an upper layer-forming slurry for forming the upper layer 32 is prepared. The upper layer-forming slurry contains Rh and/or Pt and another upper layer constituent (for example, a Ce-containing oxide or a non-Ce-containing oxide). After forming the lower layer 34, a portion (in this case, the entire base material) of the base material 10 in which the upper layer 32 is to be formed is washcoated by the upper layer-forming slurry to form the upper layer 32 on top of the lower layer 34. In this manner, the catalyst-coated layer 30 provided with the upper layer 32 and the lower layer 34 can be formed. Moreover, in a process of forming the catalyst-coated layer 30 by washcoating, a slurry may contain a binder in order to bring the slurry into suitable close contact with the surface of the base material 10 or the surface of the lower layer 34. As the binder, for example, an alumina sol or a silica sol is favorably used. A viscosity of the slurry may be suitably adjusted so that the slurry can readily flow into cells of the base material (for example, a honeycomb base material). While drying conditions of the slurry having washcoated the surface of the base material 10 are dependent on a shape and dimensions of the base material or the carrier, the drying conditions are typically around 1 to 10 hours at around 80° C. to 300° C. (for example, 100° C. to 250° C.), and firing conditions are around approximately 1 to 4 hours at around approximately 400° C. to 1000° C. (for example, 500° C. to 700° C.).

While the exhaust gas purifying catalyst 100 according to an embodiment of the present invention has been described above, the present invention is not limited to the described embodiment.

For example, while the laminate structure of the catalyst-coated layer 30 has a layer provided with the front-stage lower layer (a Ce-free layer) 34a containing Pd and the rear-stage lower layer (a Ce-containing layer) 34b described above as the lower layer 34 that is close to the surface of the base material 10 and a layer containing Rh and/or Pt described above as the upper layer 32 that is farther away from the surface of the base material 10 in the embodiment described above, the laminate structure of the catalyst-coated layer 30 may have three or more layers including another layer (for example, another layer formed between the lower layer 34 and the upper layer 32) besides the lower layer 34 and the upper layer 32. In this case, a layer provided with the front-stage lower layer (a Ce-free layer) 34a containing Pd and the rear-stage lower layer (a Ce-containing layer) 34b desirably constitutes a lowermost layer that is in contact with the surface of the base material 10. In addition, the upper layer 32 containing Rh and/or Pt may be further divided into two layers. For example, a layer including the front-stage lower layer 34a containing Pd and the rear-stage lower layer 34b may be provided on the lowermost layer that is in contact with the surface the base material 10, an intermediate layer containing Pt as a noble metal may be provided on top of the lowermost layer, and an uppermost layer containing Rh as a noble metal may be provided on top of the intermediate layer. Furthermore, in the catalyst-coated layer 30, the upper layer 32 and the lower layer 34 need not constitute an upper and lower two-layer structure over an entire area of the base material (for example, a honeycomb base material) 10 and, alternatively, a part of the upper layer 32 and a part of the lower layer 34 may be partially laminated.

While several test examples relating to the present invention will be described below, it is to be understood that the present invention is not intended to be limited by the contents indicated in the following test examples.

EXAMPLE 1

First, 20 g of alumina powder, a Pd nitrate solution (0.1 g of Pd), 125 g of a $CeO_2$—$ZrO_2$ composite oxide with a non-pyrochlore structure (50 g of CeO$_2$), 25 g of a CeO$_2$—ZrO$_2$ composite oxide with a pyrochlore structure (15 g of CeO$_2$), 2 g of barium sulfate, and water were mixed to obtain a rear-stage lower layer-forming slurry A. A portion corresponding to 50% of a length L of a monolithic honeycomb base material (with an inner volume of 1 L) from an end on an exhaust gas outflow side toward an upstream side of the base material was washcoated using the rear-stage lower layer-forming slurry A, and the base material was dried for 1 hour at 250° C. and fired for 1 hour at 500° C. to form the rear-stage lower layer 34b. In addition, 70 g of alumina powder carrying 2 g of Pd, 2 g of barium sulfate, and water were mixed to obtain a front-stage lower layer-forming slurry B. A portion corresponding to 50% of the length L of the honeycomb base material (with an inner volume of 1 L) from an end on an exhaust gas inflow side toward a downstream side of the base material was washcoated using the front-stage lower layer-forming slurry B, and the base material was dried for 1 hour at 250° C. and fired for 1 hour at 500° C. to form the front-stage lower layer 34a. Furthermore, 75 g of a CeO$_2$—ZrO$_2$ composite oxide with a non-pyrochlore structure carrying 0.2 g of Rh (15 g of CeO$_2$), 25 g of alumina powder, and water were mixed to obtain an upper layer-forming slurry C. An entire honeycomb base material (with an inner volume of 1 L) was washcoated using the upper layer-forming slurry C, and the base material was dried for 1 hour at 250° C. and fired for 1 hour at 500° C. to form the upper layer 32. An exhaust gas purifying catalyst according to the present example was obtained in this manner.

EXAMPLE 2

In the present example, an exhaust gas purifying catalyst was obtained by a same procedure as Example 1 with the exception of changing the usage of the CeO$_2$—ZrO$_2$ composite oxide with a non-pyrochlore structure in the rear-stage lower layer-forming slurry A according to Example 1 to 113 g (45 g of CeO$_2$).

EXAMPLE 3

In the present example, an exhaust gas purifying catalyst was obtained by a same procedure as Example 1 with the exception of changing the usage of the CeO$_2$—ZrO$_2$ composite oxide with a non-pyrochlore structure in the rear-stage lower layer-forming slurry A according to Example 1 to 138 g (55 g of CeO$_2$).

EXAMPLE 4

In the present example, an exhaust gas purifying catalyst was obtained by a same procedure as Example 1 with the exception of changing the usage of the CeO$_2$—ZrO$_2$ composite oxide with a pyrochlore structure in the front-stage lower layer-forming slurry B according to Example 1 to 17 g (10 g of CeO$_2$).

EXAMPLE 5

In the present example, an exhaust gas purifying catalyst was obtained by a same procedure as Example 1 with the exception of changing the usage of the CeO$_2$—ZrO$_2$ composite oxide with a pyrochlore structure in the front-stage lower layer-forming slurry B according to Example 1 to 33 g (20 g of CeO$_2$).

EXAMPLE 6

In the present example, an exhaust gas purifying catalyst was obtained by a same procedure as Example 1 with the exception of changing the usage of the CeO$_2$—ZrO$_2$ composite oxide with a non-pyrochlore structure in the upper layer-forming slurry C according to Example 1 to 50 g (10 g of CeO$_2$).

EXAMPLE 7

In the present example, an exhaust gas purifying catalyst was obtained by a same procedure as Example 1 with the exception of changing the usage of the CeO$_2$—ZrO$_2$ composite oxide with a non-pyrochlore structure in the upper layer-forming slurry C according to Example 1 to 100 g (20 g of CeO$_2$).

Comparative Example 1

60 g of alumina powder, a Pd nitrate solution (2 g of Pd), 100 g of a CeO$_2$—ZrO$_2$ composite oxide with a non-pyrochlore structure (40 g of CeO$_2$), 20 g of barium sulfate, and water were mixed to obtain a lower layer-forming slurry D. An entire monolithic honeycomb base material (with an inner volume of 1 L) was washcoated using the lower layer-forming slurry D, and the base material was dried for 1 hour at 250° C. and fired for 1 hour at 500° C. to form a lower layer. In addition, 75 g of a CeO$_2$—ZrO$_2$ composite oxide with a non-pyrochlore structure carrying 0.2 g of Rh (15 g of CeO$_2$), 25 g of alumina powder, and water were mixed to obtain an upper layer-forming slurry E. An entire honeycomb base material (with an inner volume of 1 L) was washcoated using the upper layer-forming slurry E, and the base material was dried for 1 hour at 250° C. and fired for 1 hour at 500° C. to form an upper layer. An exhaust gas purifying catalyst according to the present comparative example was obtained in this manner.

Comparative Example 2

In the present comparative example, an exhaust gas purifying catalyst was obtained by a same procedure as Example 1 with the exception of further adding 40 g of a CeO$_2$—ZrO$_2$ composite oxide with a non-pyrochlore structure (16 g of CeO$_2$) to the front-stage lower layer-forming slurry B according to Example 1 to form a front-stage lower layer.

Comparative Example 3

In the present comparative example, an exhaust gas purifying catalyst was obtained by a same procedure as Example 1 with the exception of changing the usage of the CeO$_2$—ZrO$_2$ composite oxide with a pyrochlore structure in the rear-stage lower layer-forming slurry A according to Example 1 to 0 g (in other words, a CeO$_2$—ZrO$_2$ composite oxide with a pyrochlore structure was not added).

Comparative Example 4

In the present comparative example, an exhaust gas purifying catalyst was obtained by a same procedure as Example 1 with the exception of changing the usage of the CeO$_2$—ZrO$_2$ composite oxide with a pyrochlore structure to 0 g (in other words, a CeO$_2$—ZrO$_2$ composite oxide with a pyrochlore structure was not added) and, at the same time, changing the usage of the $CeO_2$—$ZrO_2$ composite oxide with a non-pyrochlore structure to 175 g (70 g of $CeO_2$) in the rear-stage lower layer-forming slurry A according to Example 1.

With respect to the exhaust gas purifying catalysts according to the respective examples, an amount of $CeO_2$ of the $CeO_2$—$ZrO_2$ composite oxide with a non-pyrochlore structure in the front-stage lower layer, an amount of $CeO_2$ of the $CeO_2$—$ZrO_2$ composite oxide with a pyrochlore structure, an amount of $CeO_2$ of the $CeO_2$—$ZrO_2$ composite oxide with a non-pyrochlore structure, and a sum of the amounts of $CeO_2$ of the $CeO_2$—$ZrO_2$ composite oxide with a pyrochlore structure and the $CeO_2$—$ZrO_2$ composite oxide with a non-pyrochlore structure in the rear-stage lower layer, an amount of $CeO_2$ of the $CeO_2$—$ZrO_2$ composite oxide with a non-pyrochlore structure in the upper layer, and a sum of the amounts of $CeO_2$ of the $CeO_2$—$ZrO_2$ composite oxide with a non-pyrochlore structure and the $CeO_2$—$ZrO_2$ composite oxide with a pyrochlore structure in the entire catalyst are arranged in Table 1. In Table 1, "lower layer Fr" is synonymous with "front-stage lower layer", "lower layer Rr" is synonymous with "rear-stage lower layer", "pyrochlore material" is synonymous with "$CeO_2$—$ZrO_2$ composite oxide with a pyrochlore structure", and "CZ material" is synonymous with "$CeO_2$—$ZrO_2$ composite oxide with a non-pyrochlore structure".

In the table, emission (g/km) per travel distance of NOx in exhaust gas collected in the hot mode is shown in a "hot NOx" field, and emission (g/km) per travel distance of NMHC in exhaust gas collected in the cold mode is shown in a "cold HC" field.

As shown in Table 1, with the exhaust gas purifying catalysts according to Comparative examples 1 and 2 using a $CeO_2$—$ZrO_2$ composite oxide in the front-stage lower layer, cold HC exceeded 0.042 g/km. By contrast, with the exhaust gas purifying catalysts according to Examples 1 to 7 and Comparative examples 3 and 4 not using a $CeO_2$—$ZrO_2$ composite oxide in the front-stage lower layer, cold HC was equal to or lower than 0.038 g/km and cold HC purification performance was more favorable than that of Comparative examples 1 and 2. In addition, a comparison between Examples 1 to 7 and Comparative examples 3 and 4 revealed that, with the exhaust gas purifying catalysts according to Examples 1 to 7 using a $CeO_2$—$ZrO_2$ composite oxide with a pyrochlore structure in the rear-stage lower layer, emission of hot NOx was equal to or lower than 0.093 g/km, indicating greater suppression of hot NOx emission than the Comparative examples 3 and 4 only using a $CeO_2$—$ZrO_2$ composite oxide with a non-pyrochlore structure in the rear-stage lower layer. From these results, it was confirmed that an exhaust gas purifying catalyst using a $CeO_2$—$ZrO_2$ composite oxide with a pyrochlore structure

TABLE 1

| | $CeO_2$ amount [g/L] | | | | | Emission [g/km] | |
|---|---|---|---|---|---|---|---|
| Lower layer Fr | Lower layer Rr | | | Upper layer | | | |
| CZ material | Pyrochlore | CZ material | Total | CZ material | Total | Hot NOx | Cold HC |
| Example 1 | 0 | 15 | 50 | 65 | 15 | 80 | 0.00846 | 0.03621 |
| Example 2 | 0 | 15 | 45 | 60 | 15 | 75 | 0.00888 | 0.03741 |
| Example 3 | 0 | 15 | 55 | 70 | 15 | 85 | 0.00876 | 0.03734 |
| Example 4 | 0 | 10 | 50 | 60 | 15 | 75 | 0.00924 | 0.0361 |
| Example 5 | 0 | 20 | 50 | 70 | 15 | 85 | 0.00913 | 0.03744 |
| Example 6 | 0 | 15 | 50 | 65 | 10 | 75 | 0.00885 | 0.03721 |
| Example 7 | 0 | 15 | 50 | 65 | 20 | 85 | 0.00929 | 0.03688 |
| Comparative example 1 | | 40 | | | 15 | 55 | 0.00843 | 0.04539 |
| Comparative example 2 | 16 | 15 | 50 | 65 | 15 | 96 | 0.00848 | 0.04246 |
| Comparative example 3 | 0 | 0 | 50 | 50 | 15 | 65 | 0.00993 | 0.0379 |
| Comparative example 4 | 0 | 0 | 70 | 70 | 15 | 85 | 0.01128 | 0.0377 |

<Endurance Test>

The exhaust gas purifying catalyst according to each example was mounted to a gasoline engine of 2000 cc displacement, and a 20-hour endurance test was performed at an average engine speed of 3000 rpm and a catalyst inlet exhaust gas temperature of 1000° C.

<Assessment of Purification Performance>

After the endurance test, in order to compare purification performances of the exhaust gas purifying catalysts according to the respective examples, NMHC (non-methane hydrocarbons) contained in exhaust gas after passing through each exhaust gas purifying catalyst and NOx emission were measured. A 700-cc gasoline engine was used as an assessed engine, and the JC08 mode was adopted as a measurement mode. In the JC08 mode, tests are performed in both a state where the engine is warmed in advance (hot mode) and a state where the engine is completely cold (cold mode). Results thereof are shown in corresponding fields in Table 1.

in the rear-stage lower layer but not using a $CeO_2$—$ZrO_2$ composite oxide in the front-stage lower layer is capable of realizing high cold HC purification performance while suppressing emission of hot NOx.

Moreover, with Example 1 in which an amount of Ce of the $CeO_2$—$ZrO_2$ composite oxide with a pyrochlore structure in the rear-stage lower layer was set to 15 g/L, emission of hot NOx was further suppressed as compared to Examples 4 and 5. In addition, with Example 1 in which an amount of Ce of the $CeO_2$—$ZrO_2$ composite oxide with a non-pyrochlore structure in the rear-stage lower layer was set to 50 g/L, emission of hot NOx was further suppressed as compared to Examples 2 and 3. Furthermore, with Example 1 in which an amount of Ce of the $CeO_2$—$ZrO_2$ composite oxide with a non-pyrochlore structure in the upper layer was set to 15 g/L, emission of hot NOx was further suppressed as compared to Examples 6 and 7.

While specific examples of the present invention have been described in detail, such specific examples are merely illustrative and are not intended to limit the scope of claims. Techniques described in the scope of claims include various modifications and changes made to the specific examples illustrated above.

INDUSTRIAL APPLICABILITY

According to the present invention, an exhaust gas purifying catalyst capable of realizing both hot NOx purification performance and cold HC purification performance at high levels can be provided.

The invention claimed is:

1. An exhaust gas purifying catalyst arranged inside an exhaust passage of an internal combustion engine and purifying exhaust gas discharged from the internal combustion engine, the exhaust gas purifying catalyst comprising:
   a base material; and
   a catalyst-coated layer formed on a surface of the base material, wherein
      the catalyst-coated layer is formed in a laminate structure having upper and lower layers, with a layer in contact with the base material surface being the lower layer and a layer relatively farther from the base material surface being the upper layer,
      the upper layer contains Rh and/or Pt as a noble metal catalyst, and a Ce-containing oxide which contains cerium,
      the lower layer contains Pd as a noble metal catalyst,
      the lower layer is provided with, in a circulation direction of the exhaust gas, a front-stage lower layer positioned on an upstream side and a rear-stage lower layer positioned on a downstream side,
      the front-stage lower layer is a Ce-free layer that does not contain a Ce-containing oxide, and
      the rear-stage lower layer is a Ce-containing layer that contains a Ce-containing oxide with a pyrochlore structure.

2. The exhaust gas purifying catalyst according to claim 1, wherein an amount of Ce in the Ce-containing oxide with a pyrochlore structure in the rear-stage lower layer is 10 g/L to 20 g/L in terms of $CeO_2$ per liter of a volume of the base material.

3. The exhaust gas purifying catalyst according to claim 1, wherein the rear-stage lower layer further contains a Ce-containing oxide with a non-pyrochlore structure.

4. The exhaust gas purifying catalyst according to claim 3, wherein when a sum of amounts of Ce of the Ce-containing oxide with a pyrochlore structure and the Ce-containing oxide with a non-pyrochlore structure in the rear-stage lower layer is used as a base of 100% by mass, an amount of Ce in the Ce-containing oxide with a pyrochlore structure is 10% by mass to 30% by mass.

5. The exhaust gas purifying catalyst according to claim 3, wherein a sum of amounts of Ce of the Ce-containing oxide with a pyrochlore structure and the Ce-containing oxide with a non-pyrochlore structure in the rear-stage lower layer is 60 g/L to 70 g/L in terms of $CeO_2$ per liter of the volume of the base material.

6. The exhaust gas purifying catalyst according to claim 1, wherein
   the front-stage lower layer is formed in a portion corresponding to at least 30% of a length of the base material from an end on an exhaust gas inlet side toward an exhaust gas outlet side of the base material, and
   the rear-stage lower layer is formed in a portion corresponding to at least 30% of the length of the base material from an end on the exhaust gas outlet side toward the exhaust gas inlet side of the base material.

7. The exhaust gas purifying catalyst according to claim 1, wherein an amount of Ce in the Ce-containing oxide in the upper layer is 10 g/L to 20 g/L in terms of $CeO_2$ per liter of the volume of the base material.

8. The exhaust gas purifying catalyst according to claim 1, wherein the Ce-containing oxide is a ceria-zirconia composite oxide.

9. The exhaust gas purifying catalyst according to claim 2, wherein the rear-stage lower layer further contains a Ce-containing oxide with a non-pyrochlore structure.

10. The exhaust gas purifying catalyst according to claim 4, wherein a sum of amounts of Ce of the Ce-containing oxide with a pyrochlore structure and the Ce-containing oxide with a non-pyrochlore structure in the rear-stage lower layer is 60 g/L to 70 g/L in terms of $CeO_2$ per liter of the volume of the base material.

11. The exhaust gas purifying catalyst according to claim 2, wherein
   the front-stage lower layer is formed in a portion corresponding to at least 30% of a length of the base material from an end on an exhaust gas inlet side toward an exhaust gas outlet side of the base material, and
   the rear-stage lower layer is formed in a portion corresponding to at least 30% of the length of the base material from an end on the exhaust gas outlet side toward the exhaust gas inlet side of the base material.

12. The exhaust gas purifying catalyst according to claim 3, wherein
   the front-stage lower layer is formed in a portion corresponding to at least 30% of a length of the base material from an end on an exhaust gas inlet side toward an exhaust gas outlet side of the base material, and
   the rear-stage lower layer is formed in a portion corresponding to at least 30% of the length of the base material from an end on the exhaust gas outlet side toward the exhaust gas inlet side of the base material.

13. The exhaust gas purifying catalyst according to claim 4, wherein
   the front-stage lower layer is formed in a portion corresponding to at least 30% of a length of the base material from an end on an exhaust gas inlet side toward an exhaust gas outlet side of the base material, and
   the rear-stage lower layer is formed in a portion corresponding to at least 30% of the length of the base material from an end on the exhaust gas outlet side toward the exhaust gas inlet side of the base material.

14. The exhaust gas purifying catalyst according to claim 5, wherein
   the front-stage lower layer is formed in a portion corresponding to at least 30% of a length of the base material from an end on an exhaust gas inlet side toward an exhaust gas outlet side of the base material, and
   the rear-stage lower layer is formed in a portion corresponding to at least 30% of the length of the base material from an end on the exhaust gas outlet side toward the exhaust gas inlet side of the base material.

15. The exhaust gas purifying catalyst according to claim 6, wherein
   the front-stage lower layer is formed in a portion corresponding to at least 30% of a length of the base material from an end on an exhaust gas inlet side toward an exhaust gas outlet side of the base material, and the rear-stage lower layer is formed in a portion corresponding to at least 30% of the length of the base material from an end on the exhaust gas outlet side toward the exhaust gas inlet side of the base material.

16. The exhaust gas purifying catalyst according to claim 7, wherein the front-stage lower layer is formed in a portion corresponding to at least 30% of a length of the base material from an end on an exhaust gas inlet side toward an exhaust gas outlet side of the base material, and the rear-stage lower layer is formed in a portion corresponding to at least 30% of the length of the base material from an end on the exhaust gas outlet side toward the exhaust gas inlet side of the base material.

17. The exhaust gas purifying catalyst according to claim 2, wherein an amount of Ce in the Ce-containing oxide in the upper layer is 10 g/L to 20 g/L in terms of $CeO_2$ per liter of the volume of the base material.

18. The exhaust gas purifying catalyst according to claim 3, wherein an amount of Ce in the Ce-containing oxide in the upper layer is 10 g/L to 20 g/L in terms of $CeO_2$ per liter of the volume of the base material.

19. The exhaust gas purifying catalyst according to claim 4, wherein an amount of Ce in the Ce-containing oxide in the upper layer is 10 g/L to 20 g/L in terms of $CeO_2$ per liter of the volume of the base material.

* * * * *